INVENTOR.
Thomas Begg
BY Ivan D. Thornburgh
Charles H. Erne
ATTORNEYS

Nov. 4, 1947.  T. BEGG  2,429,982

CAN BODY MAKING MACHINE

Filed Dec. 9, 1943  4 Sheets-Sheet 3

INVENTOR.
Thomas Begg
BY Ivan D. Thornburgh
Charles H. Erne
ATTORNEYS

Nov. 4, 1947.        T. BEGG        2,429,982
CAN BODY MAKING MACHINE
Filed Dec. 9, 1943        4 Sheets-Sheet 4

INVENTOR.
Thomas Begg
BY Ivan D. Thornburgh
Charles H. Line
ATTORNEYS

Patented Nov. 4, 1947

2,429,982

UNITED STATES PATENT OFFICE 2,429,982

CAN BODY MAKING MACHINE

Thomas Begg, Nutley, N. J., assignor to American Can Company, New York, N. Y., a corporation of New Jersey Application December 9, 1943, Serial No. 513,507

2 Claims. (Cl. 113—12)

1

The present invention relates to a machine for making sheet metal can bodies having vent channels formed in the side seams for venting the seams during a subsequent soldering operation and has particular reference to devices located adjacent the path of travel of the body through the machine for forming the vent channels in the side seam area simultaneously with the formation of a can body.

In certain types of can bodies it is desirable to have side seams which are vented so that the vents will facilitate proper entry of solder into the seams during a subsequent soldering operation. Sometimes vent channels are formed in the side seam area for this purpose, the channels being impressed in the flat can body blanks prior to the blanks being formed into a can body. This requires a separate operation on the blanks and usually means a separate machine for performing this operation.

The instant invention contemplates effecting the vent forming operation in the same machine that forms the can body, the vent channels being impressed in the body blank or in the partially formed body as the body is being produced.

An object of the invention is the provision in a machine for making can bodies having vented side seams of vent channel forming devices wherein vent channels for venting the side seam during subsequent soldering operations are formed in the can body simultaneously with the formation of the body and in the same machine so that no extra operations or time will be needed to produce the vent channels.

Another object is the provision of such a machine wherein the forming of the vent channels is effected simultaneously with the notching of the blank from which the can body is produced, so that the vent channel forming operation will be effected at a usual station in a can body making machine and without excessive alteration of the machine parts at such a station.

Another object is the provision in a machine of this character of bumping elements for closing the side seam as an incident to producing the can body wherein the bumping elements are formed to cooperate with the vent channel forming devices to maintain the vent channels during the seam closing operation so that the vent channels will not be ironed out and thus become ineffective during the subsequent soldering operations.

Numerous other objects and advantages of the invention will be apparent as it is better understood from the following description, which, taken

2 in connection with the accompanying drawings, discloses a preferred embodiment thereof.

Referring to the drawings.

As a preferred embodiment of the present invention the drawings illustrate a can body making machine for producing sheet metal side seamed can bodies and is of the form fully described in United States Patent Number 1,770,041, issued July 8, 1930, to John F. Peters. In such a machine flat substantially rectangular shaped sheet metal blanks A are fed in an intermittent or step-by-step manner, first, into a notching station B (Fig. 1) where the opposite edge portions are notched in the usual manner and in addition the edge portion is embossed with vent channels preparatory to forming a lock and lap side seam. These notching and embossing operations are preferably effected simultaneously at the notching station.

Figure 12:
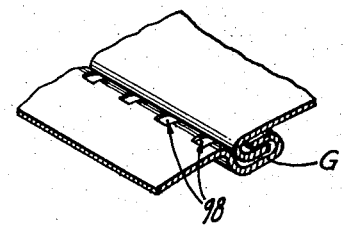
Fig. 12 is a view similar to Fig. 10 showing the hooked edges interlocked preparatory to being soldered to form the completed side seam.

The notched and embossed body blanks then are moved onto a transverse feeding device C for delivery into a second or body forming station D where they are formed into tubular shape around a body forming horn in the usual manner. The tubular shaped can bodies then are advanced along the horn into a third or body edging station E where the opposite edge portions are formed into hooks preparatory to being interlocked. The can bodies thereafter are moved along the horn into a fourth or body bumping station F at which station the hooked side seam edges are interlocked and bumped together into a body side seam G (Fig. 12).

Figure 9:
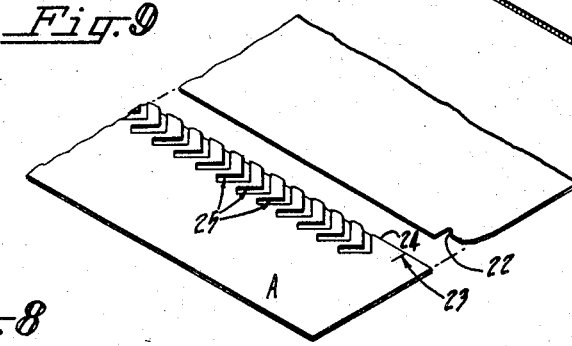
Fig. 9 is an enlarged perspective view of oppositely disposed side seam edge portions of a body blank illustrating notches and embossed corrugations in the side seam edge portion.

At the notching station B (Fig. 1) the side seam edge portions of a blank A are notched as at 22 and slit as at 23, which edge portions are best illustrated in Fig. 9. In the instant invention, the slit edge portion of the body blank designated by the numeral 24 is also formed with a series of angularly disposed, chevron shaped, spaced corrugations or serrations 25, which upon completion of the body provide vent channels around and between the hooked edges of the lock and lap side seam (see also Fig. 11). These vent channels permit venting of the side seam during the soldering operation that follows in the usual procedure of making can bodies. The corrugations preferably are arranged in a herringbone pattern along the side seam edge and extend from the outer terminal edge of the body blank inwardly and transversely of the side seam portion.

Figure 3:
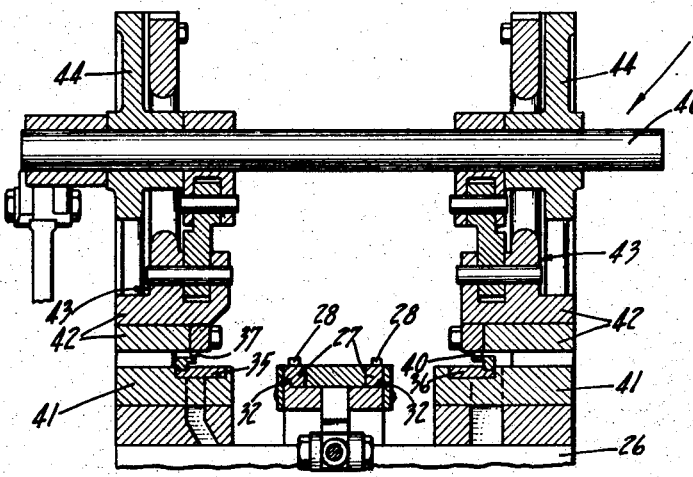
Fig. 3 is a sectional view taken substantially along the line 3—3 in Fig. 1.

Advancement of the individual blanks A into the notching station B is effected along a table 26 (Figs. 1, 2 and 3) by reciprocating feed bars 27 having spaced depressible feed dogs 28. The feed bars are slidable in grooves 32 formed in the table. The table is located at the feed-in end of the machine and is mounted on a machine main frame 33. The feed bars 27 are reciprocated in time with the other moving parts of the machine in any suitable manner, as for example, by a crank unit 34 mounted in the main frame (Fig. 2) and actuated as fully described in the Peters patent hereinbefore mentioned.

Figure 8:
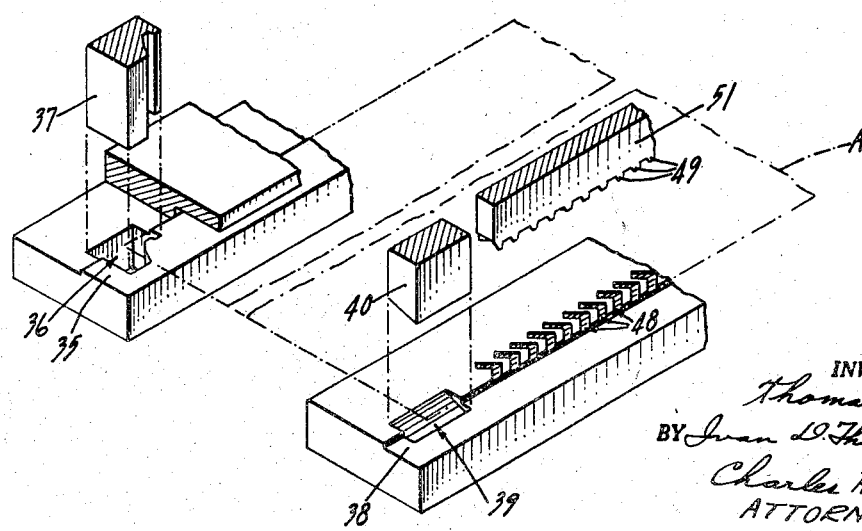
Fig. 8 is a schematic perspective view of a notching station showing can body blank notching, slitting and embossing die mechanism, with parts broken away, and showing in dot and dash lines a blank in place.

The notches 22 and the slits 23 located in the opposite side seam edge portions of the blank are formed while the blank momentarily rests at the notching station, by two sets of cooperating lower and upper die elements disposed in transversely spaced relation so that the blank is disposed between the two sets of elements. One set of die elements comprises a stationary lower notching die 35 (Fig. 8) having a notching recess 36 and a vertically reciprocable upper notching punch member 37 between which the notch edge of the blank is interposed. These die elements cut the notches 22 in the blank when the punch moves down into the die recess.

The other set of die elements for producing the slits 23 comprises a stationary lower slitting die 38 having a slitting recess 39 and a vertically reciprocable upper slitting punch 40 between which the slit edge of the blank is interposed. These die members are of usual construction and cut the slits 23 in opposite ends of the blank when the punch moves down into the die recess.

The stationary notching die 35 and the stationary slitting die 38 are located in bed plates 41 (Fig. 3) bolted to the table 26. The vertically reciprocable punches 37, 40 are secured in a pair of transversely spaced vertical slides 42 which operate in slideways 43 (see also Fig. 1) formed in a pair of brackets 44 secured to the table 26. The slides are reciprocated in unison in any suitable manner, such as for example, by way of a link and lever connection with a rocker shaft 46 as disclosed in the above mentioned Peters patent.

The embossing or impressing of the vent channel serrations 25 in the slit edge of the blank, which is effected simultaneously with the notching and slitting operation, as hereinbefore mentioned, is brought about by a lower stationary female die part having serration recesses 48 (Fig. 8) and an upper movable male embossing die part having serration embossments 49. The drawings show the recesses 48 formed in the slitting die 38 although these recesses may be formed in a separate die member forming a part of the slitting die, if desired. The embossments 49 are formed preferably in an embossing die block 51 which is secured to the slide 42 with the slitting punches 40.

Hence when the slides 42 move through a down stroke to notch and slit the blank, the embossing die block 51 moves down with the slides and in cooperation with the serration recesses 48 impress the vent channel corrugations 25 into the slit edge 24 of the blank. Thus the forming of the serrations is brought about simultaneously with the forming of the notches and the slits and at the same station. No other extra operations or handling therefore is needed and thus time and energy is saved.

Figure 4:
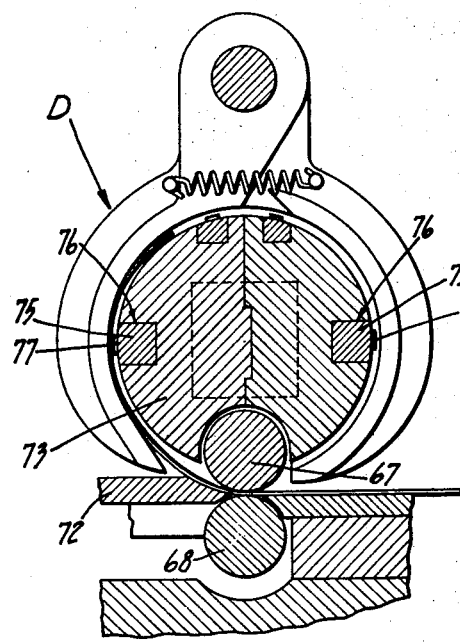
Fig. 4 is an enlarged sectional view taken substantially along the line 4—4 in Fig. 1, showing the principal parts of a can body forming device, with parts broken away.

The can body blank A with its side seam edges now in a prepared condition as illustrated in Fig. 9, is removed from the notching station and is advanced along the feed table 26 by the feed bars 27 into the transverse feeding device C. In the feeding device a reciprocating feed bar 53 advances the body blank endwise into body forming devices located at the second or body forming station D (Fig. 4). These devices are of the type disclosed in the above mentioned Peters patent and include a pair of continuously rotated feed rollers 67, 68 for feeding the blank against a stationary body forming tool 72 in the regular manner. The tool bends the body blank into tubular shape and wraps it around a body forming horn 73.

Figure 1:
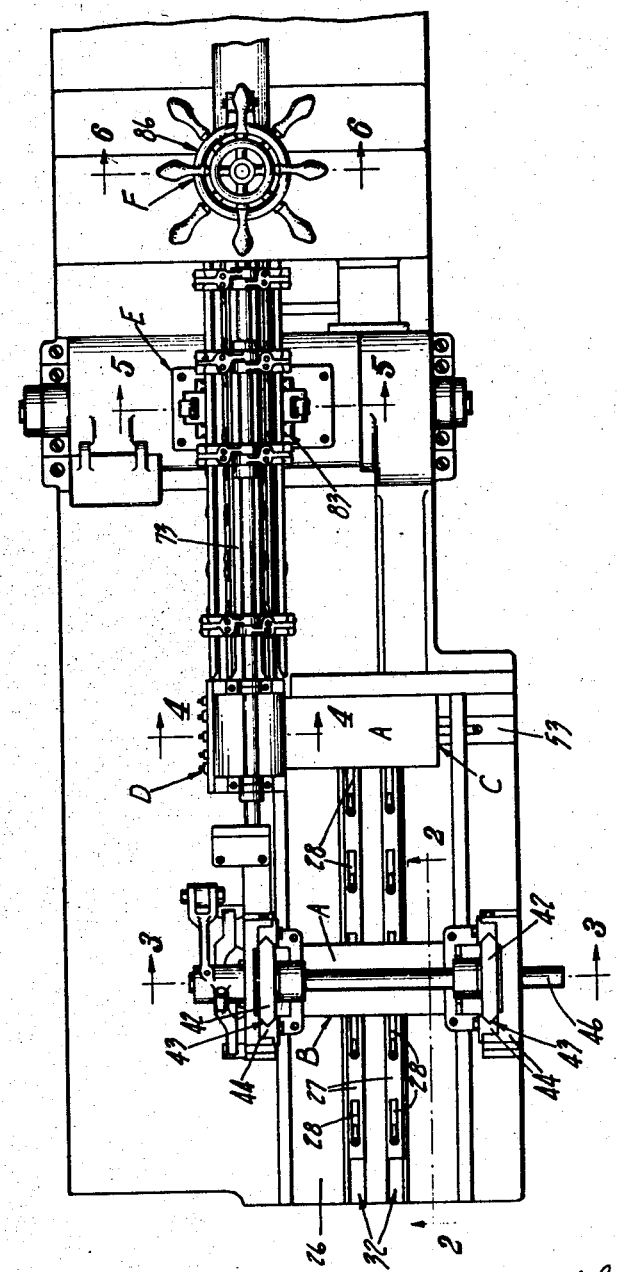
Figure 1 is a top plan view of a machine embodying the present invention, with parts broken away.
Figure 2:
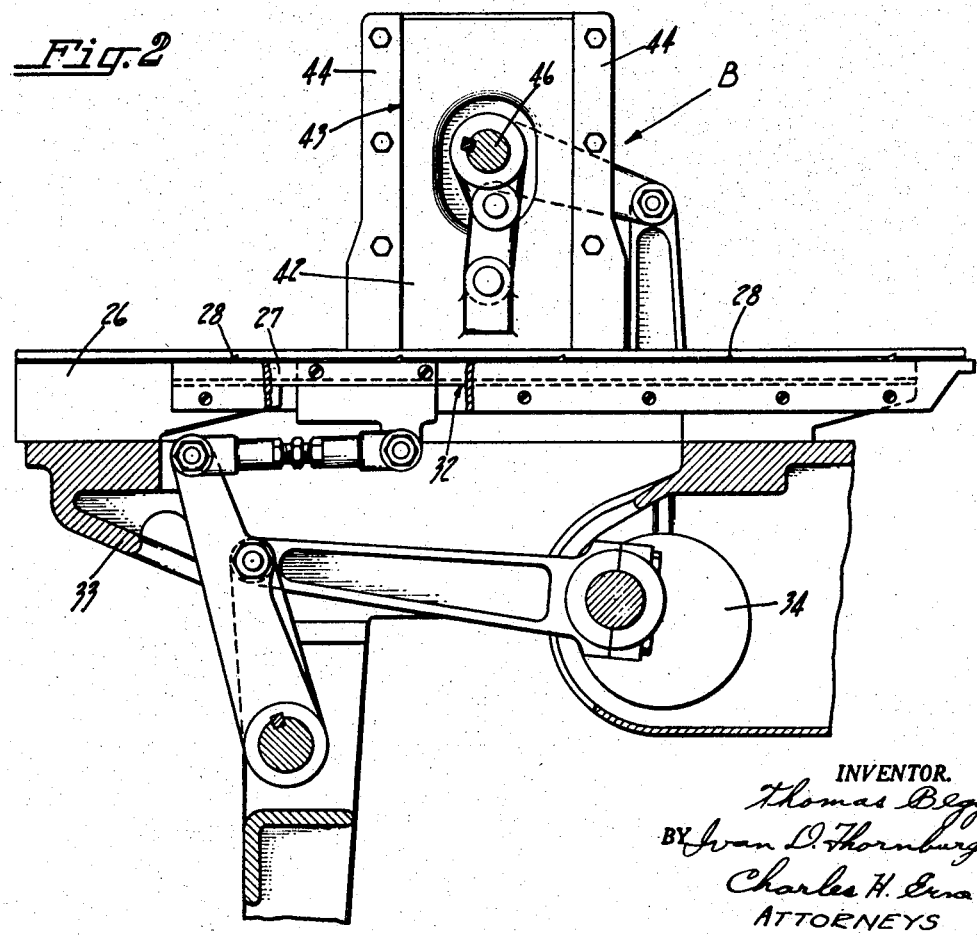
Fig. 2 is an enlarged longitudinal section of a portion of the machine as viewed substantially along the line 2—2 in Fig. 1, with parts broken away.

The body forming horn 73 is supported above the main frame in the manner disclosed in the Peters patent and extends longitudinally of the machine (Fig. 1). It is along this horn that the partially prepared can bodies are advanced for the subsequent operations at the different working stations. The bodies are advanced along the horn by reciprocating feed bars 75 which slide in grooves 76 formed in the horn. Each of these feed bars carries a plurality of spaced depressible feed dogs 77 for engaging behind and advancing the bodies.

Figure 5:
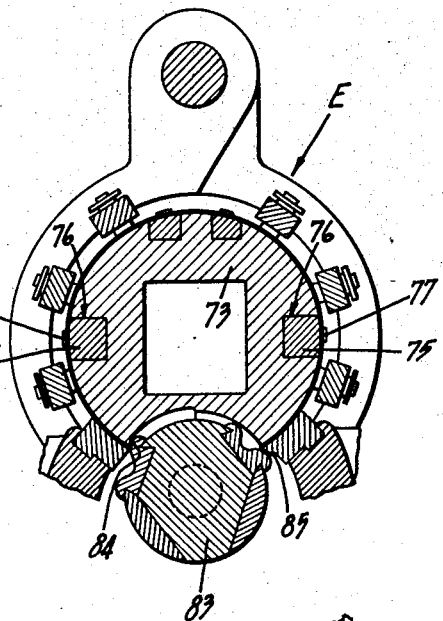
Fig. 5 is a view similar to Fig. 4 taken substantially along the line 5—5 in Fig. 1 showing the principal parts of a can body edging device, with parts broken away.
Figure 10:
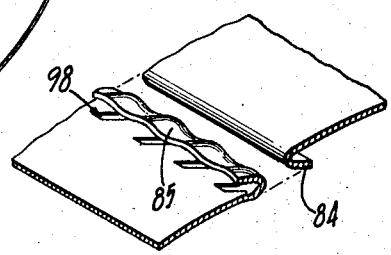
Fig. 10 is a greatly enlarged fragmentary detail of the side seam edge portions shown in Fig. 9 after they have been formed into hooks preparatory to interlocking them to form the side seam.

Following the forming of the blank into tubular shape at the forming station it is advanced along the horn 73 into the third or body edging station E (Fig. 5). At this station an oscillating edging device 83 folds the slit, serrated and notched edge portions to produce reversely bent inner and outer hooks 84, 85 (see also Fig. 10), the hook 85 including the corrugations 25. Due to folding the two bent sections of the corrugations now extend in the same direction. The elements of this edging device are identical in construction and operation with the edging devices illustrated and described in the Peters patent hereinbefore mentioned.

Figure 6:
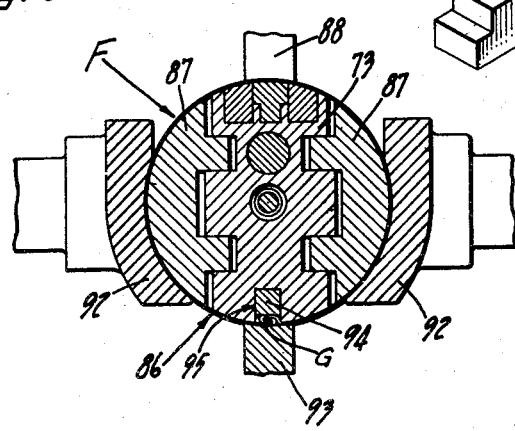
Fig. 6 is a view similar to Figs. 4 and 5 taken substantially along the line 6—6 in Fig. 1 showing the important parts of a can body side seam bumping mechanism, with parts broken away.
Figure 11:
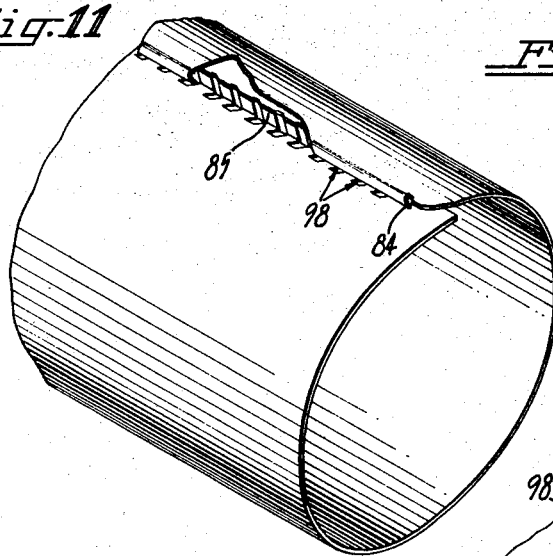
Fig. 11 is an enlarged perspective view of an incomplete can body produced in the machine of the instant invention and illustrating a formed blank with its opposite edges interengaged in readiness to be bumped into a side seam.

The inner and outer hooks of the partially prepared tubular body now are ready for interengaging as best illustrated in Fig. 11, preparatory to the bumping together of the hooks. For this purpose the body is moved along the horn 73 into a side seam bumping mechanism 86, located at the fourth or can body side seam bumping station F (Fig. 6). The body forming horn at this station is substantially rectangular in outline and has expandable segments 87 on opposite sides which are of the usual form and which are movable for receiving, sizing and releasing the partially formed can body.

With a body in position at this station (Fig. 6), a hold-down bar 88 holds the body in place while a pair of wing forming elements 92 move inwardly against it and interengage the hooks in the conventional manner. The interengaged hooks 84, 85 are locked together by a vertically reciprocating bumping element or hammer 93 which produces the body side seam G having included therein the corrugations 25. These bumping mechanism elements are actuated in the manner disclosed in the Peters patent.

Figure 7:
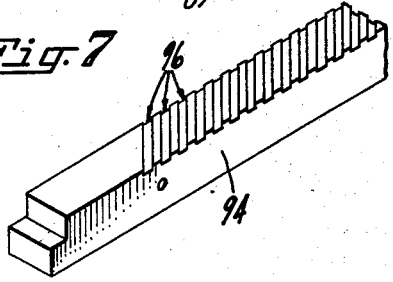
Fig. 7 is a perspective view showing a detail of a bumping element of the bumping mechanism, with a portion broken away.

In order to preserve the corrugations 25 during the bumping operation the hooks are backed up by a serrated anvil or bumping spline 94 (Fig. 7) disposed in a slot 95 in the lower side of the horn. The spline is formed with spaced diagonal clearance grooves 96 which are arranged to receive the corrugations 25 embodied in the hook 85, the corrugations being on the inside of the body.

By use of this serrated bumping spline 94 the bumping of the interengaged hooks 84, 85 is effected without ironing out or flattening the corrugations 25 in the side seam. This cooperative effect between embossing and bumping results in the formation of vent channels 98 which extend around the inner hook 84 (Fig. 11) of the side seam. Such vent channels permit easy inflow and equal distribution of solder to all parts of the vented lock and lap side seam during the soldering operation that follows in an adjacent or subsequent machine.

The partially completed can body following the bumping of the side seam G is removed from the bumping station for discharge from the instant machine. Preparation for this movement is made by collapsing the horn from its position of Fig. 6 in the usual manner as by moving the expandible segments 87 inwardly. The hold-down bar 88 also moves up and the wing forming elements 92 move outwardly releasing their hold on the body which then is free to be shifted along the horn for discharge from the machine.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for making sheet metal can bodies having vent channels formed in the side seams thereof to facilitate subsequent soldering, the combination of feeding devices for advancing a sheet metal blank along a path of travel extending through a plurality of working stations including a notching station, means at said notching station for cutting lock and lap side seam notches in the side beam portions of said blank, means adjacent said notching station for impressing inwardly extending spaced corrugated vent channels in a side seam edge portion of the blank, a longitudinally extending horn, means at another station adjacent said horn for forming thereon said notched and corrugated blank into a tubular can body, means adjacent said horn for forming hooks in the side seam edge portions of said can body by bending one of said hooks transversely across said vent channel corrugations in said blank side seam edge portion to place opposite end portions of the respective vent channels in registry with one another, means for interengaging said hooks, and seam bumping means disposed adjacent said horn for closing said side seam, said bumping means including a bumping hammer and an opposed bumping spline embedded in said horn in registry with said corrugated vent channels, said spline having spaced clearance grooves for receiving the can body vent channel corrugations therein during the bumping operation to prevent flattening of the channels thereby.

2. In a machine for making sheet metal can bodies having vent channels formed in the side seams thereof to facilitate subsequent soldering, the combination of feeding devices for advancing a sheet metal blank along a path of travel extending through a plurality of working stations including a notching station, die cutting members at said notching station for cutting lock and lap side seam notches in the side seam portions of said blank, die embossing members at said notching station for impressing a plurality of inwardly extending spaced corrugated vent channels in a side seam edge portion of the blank simultaneously with the cutting of said notches, a longitudinally extending horn, means at another of said stations adjacent said horn for forming thereon said notched and channeled blank into a tubular can body, means adjacent said horn for forming hooks in the side seam edge portions of said can body by bending one of said hooks transversely across said vent channel corrugations in said blank side seam edge portion to place opposite end portions of the respective vent channels in registry with one another, means for interengaging said hooks, and seam bumping means disposed adjacent said horn for closing said side seam, said bumping means including a movable bumping hammer and an opposed serrated bumping spline embedded in said horn in registry with said corrugated vent channels and having a plurality of clearance grooves therein for receiving the vent channel corrugations to preserve the configuration thereof during the seam bumping operation.

THOMAS BEGG.

REFERENCES CITED

The following references are of record in the file of this patent:

UNITED STATES PATENTS

| Number | Name | Date |
|---|---|---|
| 1,770,041 | Peters | July 8, 1930 |
| 2,309,963 | Krueger | Feb. 2, 1943 |
| 2,167,737 | Anderson | Aug. 1, 1939 |
| 828,723 | Dugan | Aug. 14, 1906 |